April 11, 1944. V. A. CABEZA 2,346,536
SAFETY COVER FOR SHEARING MACHINES
Filed Jan. 5, 1944 2 Sheets-Sheet 2
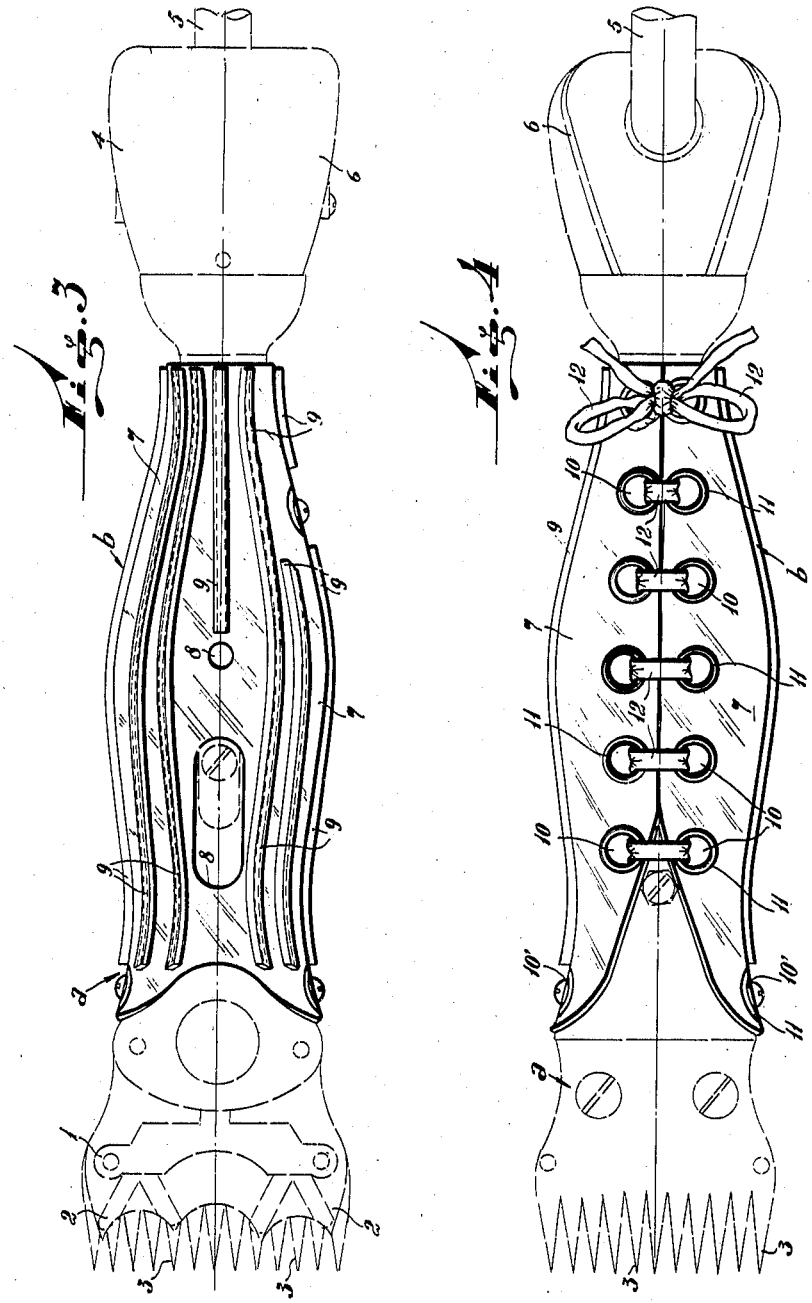
Inventor
Victor Alejandro Cabeza
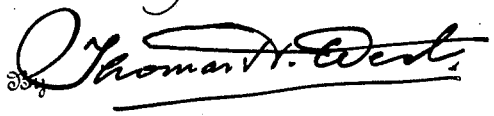
Attorney Patented Apr. 11, 1944

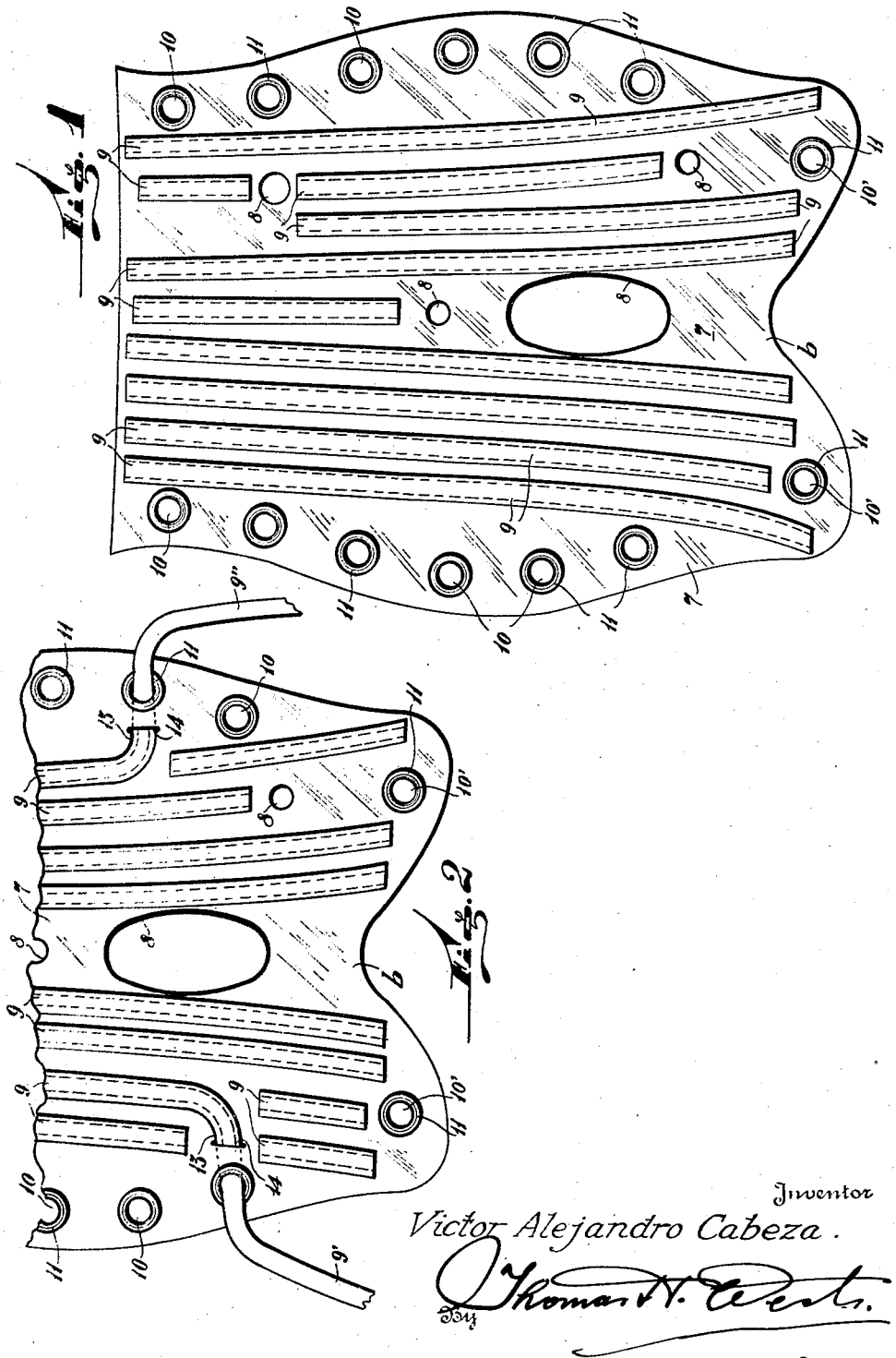

2,346,536

UNITED STATES PATENT OFFICE 2,346,536

SAFETY COVER FOR SHEARING MACHINES

Victor Alejandro Cabeza, Rio Grande, Argentina

Application January 5, 1944, Serial No. 517,056
In Argentina November 17, 1943

8 Claims. (Cl. 30—123)

This invention relates to improvements in safety grip covers for use in connection with shearing machines and the like.

Shearing machines are generally subject to a strong vibrative motion due to the fact that the shaft moving the mechanism actuating the shearing blade is connected by means of a movable joint, generally a universal joint, with a further shaft controlling same, whereby the shearing machine will tend to effect a rotary motion in the same direction as said shaft.

Therefore, the operator must not only pay attention to the shearing operation itself, but also take care of avoiding any sudden deviation of the machine which might directly harm the skin of the animal or even his own hand.

Attempts have been made to neutralize these movements by arranging a plain leather covering over the grip or handle of the machine. This device is generally of rectangular shape, with the longer sides outwardly curved, and is provided, adjacent said sides, with a plurality of eyelets serving to secure said cover around the body of said grip, for which purpose a strip of leather or the like is passed through said eyelets, the ends of said leather strip being tied together.

While this resource has to a certain degree improved the safety of operation, since it allows a more firm grip of the machine, it does not neutralize the above-mentioned effect to the desired extent, due to the fact that with the use the plain leather cover becomes greased and hence slippery.

A further drawback of the known devices used for this purpose is that the cover generally obstructs the lubricating orifices provided in the body of the machine, and since the intensive use of shearing machines requires frequent lubrication, in order to do this it is necessary each time to remove the plain leather cover and to replace same after lubrication has been completed.

Some improved devices are provided with holes coinciding with the lubricating orifices for the purpose of obviating the necessity of having to remove said cover in order to perform the lubricating operation. However, said orifices become rapidly stopped with dirt and wool.

The present invention overcomes the above-mentioned drawbacks by arranging on the outer face of the leather cover, a series of projections located so as to leave said lubricating holes uncovered.

The main object of said projections is to enable the safe and ready control of the machine, completely neutralizing the movements which are the source of the above-named drawbacks.

A further object of the invention is to provide means for maintaining the lubricating orifices uncovered, and this object is achieved by said projections which will keep the palm of the hand spaced from said orifices.

Other objects and advantages of the invention will become apparent from the course of the following specification, when read in conjunction with the accompanying drawings illustrating the invention by way of example and in a preferred embodiment.

In the drawings:

Fig. 1 is a plan view of the safety grip cover embodying the improvements of the present invention.

Fig. 2 is a plan view of one of the ends of said grip cover, in a somewhat modified embodiment.

Fig. 3 is a side elevation of the improved grip cover, applied to a shearing machine; and Fig. 4 is a bottom plan view of the same device as shown in Fig. 3, illustrating the manner in which the safety cover is applied to the body of the grip of a shearing machine.

The same reference characters are used to indicate corresponding parts or elements throughout the drawings.

With reference to the drawings, the shearing machine $a$ comprises a head 1 provided with corresponding teeth 2 for guiding the wool, and a blade 3 for cutting the latter. The rear end 4 of said machine comprises a universal joint (not shown) by means of which the driving shaft of the general installation is connected with the shaft 5 (Figs. 3 and 4) of the shearing machine, said shaft 5 in turn setting in motion the means actuating said blade 3. Said universal joint is enclosed in a shielding cover 6, generally made of leather, and the means for actuating the blade 3, upon being set in motion, cause the vibration of the machine, with a tendency to cause the rotation of the latter.

The improved safety cover $b$ of the present invention, clearly shown in Fig. 1 comprises a body 7, preferably made of strong leather and shaped so as to be adapted to the body of the grip of the shearing machine. In the embodiment illustrated, said safety cover is generally rectangular in shape, with the longer sides curved outwardly, as shown in Fig. 1.

Said body 7 is provided with a plurality of holes 8 so that when said cover is applied about the grip of the shearing machine, said holes will coincide with lubricating orifices provided in said grip. A plurality of strips 9, preferably made of leather, are attached to one of the faces of said body 7, thereby constituting projections capable or preventing the sliding of the machine when in use, whereby a more firm gripping of the machine may be obtained. In the embodiment illustrated, said strips or bands 9 are attached to said body 7 by means of a plurality of seams.

In the embodiment illustrated the projections 9 are longitudinally arranged and parallel to each other. It is evident, however, that said projections 9 could equally well be undulated or arranged in V shape, or obliquely relative to the body 7. Also, they may be formed in the body 7 itself. In all cases, the projections 9 are arranged so as to leave the orifices 8 unobstructed.

A series of perforations 10 are provided along the sides of body 7, guarded by means of metal eyelets 11. Two perforations 10' having metal eyelets 11 are also provided at one end of said body 7, said perforations 10' being adapted to receive corresponding screws for holding the body 7 in position against the grip of the shearing machine, as shown in Figs. 3 and 4.

On mounting the safety cover onto the body a of the shearing machine (Figs. 3 and 4) the borders having the perforations 10 will remain in front of each other. A leather strip or lace 12 is passed through said perforations 10, and the ends of said strip or lace are tied together tightly, whereby the safety cover will remain firmly secured around the body of the grip of the shearing machine, as shown in Fig. 4.

The separate lace 12 may be replaced by elements forming part of the cover itself. This embodiment, which offers the advantage of avoiding the loss of the lace, is illustrated in Fig. 2, wherein it may be seen that, starting from the zone 13, two of the projections 9 extend in the form of laces 9', 9" which are deflected so as to pass through slits 14 and through the nearest eyelets 11 from underneath. As shown in Fig. 2, said projections 9 are diverted at different heights, as it will be necessary to initially pass one of the laces (9' in the example illustrated) through the lower pair of orifices 10, while the other lace 9" will start at the height of the next pair of perforations 10 so as to pass therethrough. The laces 9' and 9" are passed through alternate pairs of perforations 10 until the free ends thereof are finally tied together.

It is evident that in carrying the invention into practice, several changes and modifications may occur to those skilled in the art, without departing from the scope of the invention as clearly set forth in the appended claims.

I claim:

1. Improvements in safety covers for shearing machines, of the type comprising a leather body of a shape suitable to be adapted against the body of the shearing machine grip, with perforations for facilitating the lubrication of said shearing machine, wherein the upper face of said leather body is provided with a series of projections arranged so as to leave said lubricating perforations uncovered.

2. Improvements in safety covers for shearing machines, of the type comprising a leather body of a shape suitable to be adapted against the body of the shearing machine grip, with perforations for facilitating the lubrication of said shearing machine, wherein the upper face of said leather body has attached thereto a series of substantially parallel longitudinal strips of flexible material, arranged so as to leave said lubricating perforations uncovered.

3. Improvements in safety covers for shearing machines, of the type comprising a leather body of a shape suitable to be adapted against the body of the shearing machine grip, with perforations for facilitating the lubrication of said shearing machine, wherein the upper face of said leather body has attached thereto a series of strips of flexible material obliquely arranged thereon.

4. Improvements in safety covers for shearing machines, of the type comprising a leather body of a shape suitable to be adapted against the body of the shearing machine grip, with perforations for facilitating the lubrication of said shearing machine, wherein the upper face of said leather body has attached thereto a series of strips of flexible material arranged in V-shape thereon.

5. Improvements in safety covers for shearing machines, of the type comprising a leather body of a shape suitable to be adapted against the body of the shearing machine grip, with perforations for facilitating the lubrication of said shearing machine, wherein the upper face of said leather body is provided with a series of projections.

6. Improvements in safety covers for shearing machines, of the type comprising a leather body of a shape suitable to be adapted against the body of the shearing machine grip, with perforations for facilitating the lubrication of said shearing machine, wherein the upper face of said leather body is provided with a series of parallel longitudinal strips of flexible material arranged so as to leave said lubricating perforations uncovered, two of said strips extending so as to form laces capable of being passed through eyelets provided near the longitudinal borders of said leather body, so as to secure said leather body around said grip body.

7. Improvements in safety covers for shearing machines, of the type comprising a leather body of a shape suitable to be adapted against the body of the shearing machine grip, with perforations for facilitating the lubrication of said shearing machine, wherein the upper face of said leather body has a series of strips of flexible material attached thereto and arranged so as to leave said lubricating perforations substantially uncovered, two of said strips extending so as to form laces capable of being passed through eyelets provided near the longitudinal borders of said leather body, so as to secure said leather body around said grip body.

8. Improvements in safety covers for shearing machines as claimed in claim 7, wherein said leather body is provided with suitable located slits through which said laces are initially passed.

VICTOR ALEJANDRO CABEZA.